(12) United States Patent
Cura et al.

(10) Patent No.: US 10,632,707 B2
(45) Date of Patent: Apr. 28, 2020

(54) MULTILAYER STRUCTURAL ADHESIVE FILM

(71) Applicant: 3M INNOVATIVE PROPERTIES COMPANY, St. Paul, MN (US)

(72) Inventors: Elisabeth Cura, Dusseldorf (DE); Sohaib Elgimiabi, Dusseldorf (DE); Stefan Luebbe, Essen (DE); Kotaro Shinozaki, Kanagawa-pref. (JP); Saori Ueda, Kanagawa pref. (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/774,621

(22) PCT Filed: Nov. 14, 2016

(86) PCT No.: PCT/US2016/061762
§ 371 (c)(1),
(2) Date: May 9, 2018

(87) PCT Pub. No.: WO2017/087296
PCT Pub. Date: May 26, 2017

(65) Prior Publication Data
US 2018/0272646 A1    Sep. 27, 2018

(30) Foreign Application Priority Data
Nov. 19, 2015    (EP) .................................. 15195400

(51) Int. Cl.
*B32B 3/04*    (2006.01)
*B32B 5/02*    (2006.01)
(Continued)

(52) U.S. Cl.
CPC ................ *B32B 3/04* (2013.01); *B32B 1/00* (2013.01); *B32B 3/00* (2013.01); *B32B 3/02* (2013.01);
(Continued)

(58) Field of Classification Search
CPC ....................................................... B32B 3/04
(Continued)

(56) References Cited

U.S. PATENT DOCUMENTS 3,904,813 A    9/1975    Groff
3,929,270 A    12/1975    Keith
(Continued)

FOREIGN PATENT DOCUMENTS

| CN | 101581043 | 11/2009 |
| CN | 202682169 | 1/2013 |

(Continued)

OTHER PUBLICATIONS

"Textiles—Standard Atmospheres for Conditioning and Testing," International Standard, ISO 139, Second Edition, 2005, pp. 1-15.
(Continued)

*Primary Examiner* — Brent T O'Hern
(74) *Attorney, Agent, or Firm* — Harold C. Knecht, III

(57) ABSTRACT

The invention relates to the use of a structural adhesive film for bonding and sealing a hem flange connection between panels. The structural adhesive film comprises at least one adhesive layer and at least one layer with a porous structure. The adhesive layer comprise an epoxy compound as well as an epoxy curing agent.

19 Claims, 2 Drawing Sheets

(51) Int. Cl.
| | |
|---|---|
| *B32B 15/092* | (2006.01) |
| *B32B 27/12* | (2006.01) |
| *B32B 3/06* | (2006.01) |
| *B32B 7/12* | (2006.01) |
| *B32B 3/02* | (2006.01) |
| *B32B 3/00* | (2006.01) |
| *B32B 3/26* | (2006.01) |
| *B32B 27/34* | (2006.01) |
| *B32B 27/26* | (2006.01) |
| *B32B 15/00* | (2006.01) |
| *B32B 27/06* | (2006.01) |
| *B32B 15/04* | (2006.01) |
| *B32B 7/04* | (2019.01) |
| *B32B 27/32* | (2006.01) |
| *B32B 27/00* | (2006.01) |
| *B32B 7/10* | (2006.01) |
| *B32B 5/00* | (2006.01) |
| *B32B 7/00* | (2019.01) |
| *B32B 1/00* | (2006.01) |
| *B32B 27/36* | (2006.01) |
| *B32B 27/30* | (2006.01) |
| *B32B 3/30* | (2006.01) |
| *B32B 7/02* | (2019.01) |
| *B32B 15/08* | (2006.01) |
| *B32B 27/18* | (2006.01) |
| *B32B 27/38* | (2006.01) |
| *B32B 15/14* | (2006.01) |
| *B32B 37/12* | (2006.01) |
| *B32B 38/00* | (2006.01) |

(52) U.S. Cl.
CPC .................. *B32B 3/06* (2013.01); *B32B 3/26* (2013.01); *B32B 3/30* (2013.01); *B32B 5/00* (2013.01); *B32B 5/02* (2013.01); *B32B 5/022* (2013.01); *B32B 5/024* (2013.01); *B32B 5/026* (2013.01); *B32B 7/00* (2013.01); *B32B 7/02* (2013.01); *B32B 7/04* (2013.01); *B32B 7/10* (2013.01); *B32B 7/12* (2013.01); *B32B 15/00* (2013.01); *B32B 15/04* (2013.01); *B32B 15/08* (2013.01); *B32B 15/092* (2013.01); *B32B 15/14* (2013.01); *B32B 27/00* (2013.01); *B32B 27/06* (2013.01); *B32B 27/12* (2013.01); *B32B 27/18* (2013.01); *B32B 27/26* (2013.01); *B32B 27/30* (2013.01); *B32B 27/308* (2013.01); *B32B 27/32* (2013.01); *B32B 27/34* (2013.01); *B32B 27/36* (2013.01); *B32B 27/38* (2013.01); *B32B 37/1207* (2013.01); *B32B 38/0012* (2013.01); *B32B 2250/00* (2013.01); *B32B 2262/00* (2013.01); *B32B 2262/0261* (2013.01); *B32B 2262/0276* (2013.01); *B32B 2262/062* (2013.01); *B32B 2262/101* (2013.01); *B32B 2262/106* (2013.01); *B32B 2307/40* (2013.01); *B32B 2307/546* (2013.01); *B32B 2307/724* (2013.01); *B32B 2307/726* (2013.01); *B32B 2307/734* (2013.01); *B32B 2363/00* (2013.01); *B32B 2367/00* (2013.01); *B32B 2405/00* (2013.01); *B32B 2419/00* (2013.01); *B32B 2605/00* (2013.01); *B32B 2605/003* (2013.01); *B32B 2605/08* (2013.01); *B32B 2607/00* (2013.01)

(58) Field of Classification Search
USPC .......................................................... 428/124
See application file for complete search history.

(56) References Cited

U.S. PATENT DOCUMENTS

| | | |
|---|---|---|
| 5,523,146 A | 6/1996 | Bodford et al. |
| 5,589,249 A | 12/1996 | Bodford et al. |
| 5,705,011 A | 1/1998 | Bodford et al. |
| 6,000,118 A | 12/1999 | Biernat et al. |
| 6,368,008 B1 | 4/2002 | Biernat et al. |
| 6,528,176 B1 | 3/2003 | Asai et al. |
| 7,621,110 B2 | 11/2009 | Ota et al. |
| 2005/0196562 A1 | 9/2005 | Ota et al. |
| 2006/0210752 A1 | 9/2006 | Ota et al. |
| 2010/0038025 A1 | 2/2010 | Keite-Telgen-Büescher et al. |
| 2010/0273378 A1 | 10/2010 | Palinsky et al. |
| 2011/0217895 A1 | 9/2011 | Peterson |
| 2015/0050075 A1 | 2/2015 | Kelley et al. |

FOREIGN PATENT DOCUMENTS

| | | | |
|---|---|---|---|
| CN | 203220645 | 10/2013 | |
| DE | 1100213 | 2/1961 | |
| EP | 0750654 | 1/1997 | |
| EP | 1530617 | 5/2005 | |
| EP | 1532220 | 5/2005 | |
| EP | 1884533 | 2/2008 | |
| EP | 2229421 | 9/2010 | |
| EP | 2529856 | 12/2012 | |
| JP | 2001021081 | 1/2001 | |
| WO | WO 00/10802 | 3/2000 | |
| WO | WO 01/58740 | 8/2001 | |
| WO | WO 02/079337 | 10/2002 | |
| WO | WO 2005/023950 | 3/2005 | |
| WO | WO 2007/014039 | 2/2007 | |
| WO | WO 2009/071269 | 6/2009 | |
| WO | WO-2009071269 A1 * | 6/2009 | ........... B21D 39/021 |
| WO | WO 2012/024354 | 2/2012 | |
| WO | WO 2012/125995 | 9/2012 | |
| WO | WO 2014/031838 | 2/2014 | |
| WO | WO 2014/200965 | 12/2014 | |
| WO | WO 2015/004190 | 1/2015 | |
| WO | WO 2017/087296 | 5/2017 | |
| WO | WO 2017/196804 | 11/2017 | |
| WO | WO 2017/197087 | 11/2017 | |
| WO | WO 2017/197097 | 11/2017 | |

OTHER PUBLICATIONS

International Search Report for PCT International Application No. PCT/US2016/061762, dated Jan. 2, 2017, 5 pages.

\* cited by examiner

MULTILAYER STRUCTURAL ADHESIVE FILM

CROSS REFERENCE TO RELATED APPLICATIONS

This application is a national stage filing under 35 U.S.C. 371 of PCT/US2016/061762, filed Nov. 14, 2016 which claims the benefit of European Application No. 15195400.5, filed Nov. 19, 2015, the disclosures of which are incorporated by reference in their entireties herein.

FIELD OF THE INVENTION

The invention relates to the use of a structural adhesive film for bonding and sealing a hem flange connection between panels, e.g. similar or dissimilar material panels. The invention also relates to a method for bonding and sealing parts.

BACKGROUND

Joints, e.g. metal joints, in vehicles (e.g., automobiles, aircraft, boats, etc.) may be formed through the use of an adhesive. For example, an adhesive may be used to bond a metal panel (e.g., a roof panel) to a support structure or chassis of the vehicle. Further, an adhesive may be used in joining two metal panels of a vehicle closure panel assembly. Vehicle closure panel assemblies typically comprise an assembly of an outer and an inner metal panel whereby a hem structure is formed by folding an edge of an outer panel over an edge of the inner panel. Typically, an adhesive is provided there between to bond the panels together. Further, a sealant typically needs to be applied at the joint of the metal panels to provide for sufficient corrosion protection. For example, U.S. Pat. No. 6,000,118 discloses the use of a flowable sealant bead between the facing surfaces of two panels (e.g., of a door), and a thin film of uncured paint-like resin between a flange on an outer panel and the exposed surface of an inner panel. The paint-like film is cured to a solid impervious condition by a baking operation performed on the completed panel assembly (e.g., a door). U.S. Pat. No. 6,368,008 discloses the use of an adhesive for securing two metal panels together forming a joint. The edge of the joint is further sealed by a metal coating. WO 2009/071269 discloses an expandable epoxy paste adhesive as a sealant for a hem flange. A further hemmed structure is disclosed in U.S. Pat. No. 6,528,176.

Further efforts have been undertaken to develop adhesive compositions whereby two panels, e.g. metal panels, in particular an outer and an inner panel of a vehicle closure panel, could be joined with an adhesive without the need for further material for sealing the joint. Thus it became desirable to develop adhesive systems that provide adequate bonding while also sealing the joint and providing corrosion resistance. A partial solution has been described in e.g. WO 2007/014039, which discloses a thermally expandable and curable epoxy-based precursor of an expanded thermoset film toughened foamed film comprising a mixture of solid and liquid epoxy resins, and claimed to provide both favourable energy absorbing properties and gap filling properties upon curing.

SUMMARY OF THE INVENTION

Without contesting any technical advantages that may be associated with the adhesive compositions and systems previously disclosed in the art, there is still a need for a high performance structural adhesive film that exhibits any one or combination of excellent physical properties such as, e.g., form stability, flexibility, robustness and handling properties in uncured state; as well as excellent bonding and sealing performances after curing.

In addition, in some instances, it is possible that the panels or plates (e.g. a hemmed metal panel assembly), with an uncured and unexpanded structural adhesive film according to the invention in between the two panels, passes through one or several baths before being put into a curing oven. During this process step, liquid may enter a space between the two panels next to the adhesive film. During curing, when heat gets applied, the liquid may become gaseous and try to escape. This process might impact the appearance and also the sealing function of the cured structural adhesive film.

Furthermore, car manufacturers prefer that the adhesive film used for connecting the two panels of a hem joint completely covers the outer edge of the outer metal panel that is hemmed over an edge of the inner panel. Therefore, it is an objective of the invention to protect the outer edge of the outer panel with the hem adhesive itself. The outer panel edge is preferably fully covered and moreover presents a good visual appearance.

In view of the above, there is an additional need for an improved structural adhesive film that combines the above mentioned properties with fully covering the edge of an outer panel and to present a good visual appearance of the expanded film after cure.

In the context of the invention, a film with a "good visual appearance" is defined as a film having a smooth surface that extends essentially linear and essentially parallel to the edges of the panels it is bonding. In addition, to the linear and parallel extension of the film, a film with a good appearance has a smooth surface that is essentially free from irregularities like bubbles or entrapped gas. In other words a good visual appearance means that the expanded tape after cure has a substantially smooth surface without traces of bubbles.

According to one aspect, the present invention is directed to the use of a structural adhesive film comprising: at least one adhesive layer; and at least one layer with a porous structure. The adhesive layer comprises an epoxy compound as well as an epoxy curing agent for bonding and sealing a hem flange connection between panels, e.g. similar or dissimilar metal, or other material, panels.

The term "film" used throughout the present description relates to mostly two-dimensional articles, which are much thinner than they are wide or long. A film can be in the form of a strip, foil, band, sheet, sheeting or the like.

It has been found that a structural adhesive film comprising an epoxy compound as well as an epoxy curing agent can provide a good basis for a high performance structural adhesive film that exhibits one or any combination of excellent physical properties such as, e.g., form stability, flexibility, robustness and handling properties in an uncured state; as well as excellent bonding and sealing performances after curing. In addition, the structural adhesive film of the present invention is particularly suitable for automated handling and application, in particular by fast robotic equipment.

The structural adhesive film according to the present invention, comprises a thermosettable composition that comprises an epoxy compound. The epoxy compound may have an equivalent weight of less than 250 g/equivalent. Suitable epoxy compounds for use herein will be easily identified by those skilled in the art, in the light of the present description. The epoxy compound for use herein is preferably selected from the group of epoxy compounds having an average epoxy functionality, i.e. an average number of polymerizable epoxy groups per molecule, of at least 2 and, more preferably, from 2 or 3 to 4.

Any organic compound having at least one oxirane ring polymerizable by a ring opening reaction may be used as an epoxy compound in the thermosettable composition of the structural adhesive film according to the invention. Such materials, broadly called epoxies, include monomeric epoxy compounds and polymeric epoxy compounds and can be aliphatic cycloaliphatic aromatic or heterocyclic. Useful materials generally have at least two polymerizable epoxy groups per molecule and, more preferably, from 2 or 3 to 4 polymerizable epoxy groups per molecule.

These epoxy compounds are generally liquid, or semi-liquid, at room temperature and are frequently also referred to as reactive epoxy thinners or reactive epoxy diluents. These compounds are preferably selected from the group of optionally substituted di- and polyglycidyl ethers of di- and polyphenols or aliphatic or cycloaliphatic hydroxyl compounds. Suitable epoxy compounds for use herein are commercially available from Momentive under tradename Epicote™ 828; from Dow Chemical Co. under tradename DER 331, DER 332 and DER 334; from Resolution Performance Products under tradename Epon® 828; from Polysciences, Inc. under tradename Epon® 825/826/830/834/863/824; from Hexion under tradename Bakelite® EPR 164; from Huntsman under tradename Araldite® GY 259/260; or from Leuna Harze under tradename EPILOX® A 1900.

Epoxy compounds which are useful in the structural adhesive film are preferably derived from bisphenol A, bisphenol E, bisphenol F, bisphenol S, aliphatic and aromatic amines, such as methylene dianiline and aminophenols, and halogen substituted bisphenol resins, novolacs, aliphatic epoxies, and combinations thereof and/or there between. More preferably, the organic epoxies are selected from the group comprising diglycidyl ethers of bisphenols A and bisphenol F and epoxy novolacs.

The amount of epoxy compound in the thermosettable composition of the structural adhesive film is typically comprised between 30 and 60 wt. %, preferably between 40 and 60 wt. %, more preferably between 50 and 60 wt. %, based on total weight of the thermosettable composition.

The at least one layer with a porous structure comprised in the structural adhesive film according to the invention provides the additional advantage of improving the stability of the structural adhesive film, which leads to more robust covering of the outer edge of one panel to be bonded. The porous layer may also provide a conformability to the structural adhesive film, which may be for example used to pre-form the structural adhesive film, before it is applied to any one of the panels and thereby it can be much more suitable for automated handling and application, in particular by fast robotic equipment. Finally the porosity of the layer may help the above mentioned gas that may be generated during the curing step, to escape out of a space between two panels next to the film. The porosity or the layer may also help to absorb the adhesive from the adhesive layer during the curing process. Each one of these properties of the layer may lead to a good covering of the outer edge of the panel and to a good appearance of the tape after curing. The layer with a porous structure may for example be a porous carrier layer.

In a preferred embodiment the porous layer is a malleable scrim or mesh with a lower density. The lower density leads to a porosity of the layer with the above mentioned advantages. The porous layer may also be a wipe, e.g. a spunlaced wipe. Spunlacing is also called hydroentanglement. It is a bonding process for wet or dry fibrous webs made by either carding, air-laying or wet-laying, with the resulting bonded fabric being a non-woven. It uses fine, high pressure jets of water which penetrate the web, if transported by a belt or wire, hit the conveyor belt or conveyor wire and bounce back causing the fibers to entangle with each other. This process can also be considered as a two-dimensional equivalent of spinning fibers into yarns prior to weaving. In other words the hydroentangled bonding technology is a system in which water is emitted under high pressure and velocity from closely positioned nozzles onto a web of loose fibers. The intensity of the water stream and the pattern of the supporting drum or belt entangle, spin and curl the web's fibers about one another. The entangling of the fibers and the friction between the web's fibers yields a cohesive web. The water pressure has a direct bearing on the strength of the web, and very high pressures not only entangle but can also split fibers into micro- and nano-fibers which may give the resulting hydroentangled non-woven a leather like or even silky texture. This type of non-woven can be as strong and tough as woven fabrics made out of the same fibers.

Other preferred properties of the porous layer are a high softness and flexibility. These properties help to apply the film in an easy manner, even in areas with more complex geometries. Another preferred property of the porous layer is a good drapability. A further requirement of a porous layer according to the invention is a sufficient strength and the requirement to withstand the temperatures in a curing oven, which may for example be up to 180° C., e.g. 120° C.

According to another aspect of the invention, the at least one adhesive layer of the structural adhesive tape according to the invention may comprise an epoxy compound, an epoxy curing agent, a thermoplastic resin and optionally a toughening agent.

In a preferred aspect, thermoplastic resin for use herein may have a softening point comprised between 30° C. and 140° C., preferably between 80° C. and 100° C., more preferably between 85° C. and 95° C. Suitable thermoplastic resins for use herein will be easily identified by those skilled in the art, in the light of the present description. Suitable thermoplastic resins for use herein are preferably selected from the group consisting of polyether thermoplastic resins, polypropylene thermoplastic resins, polyvinyl chloride thermoplastic resins, polyester thermoplastic resins, polycaprolactone thermoplastic resins, polystyrene thermoplastic resins, polycarbonat thermoplastic resins, polyamide thermoplastic resins, and any combinations of mixtures thereof. The amount of thermoplastic resin in the composition of the structural adhesive film is typically comprised between 10 and 50 wt. %, preferably between 15 and 30 wt. %, more preferably between 20 and 30 wt. %, based on total weight of the composition.

Any toughening agent, commonly known in the art, may be used in the thermosettable composition of the structural adhesive film of the invention. The toughening agents are preferably selected from a group comprising core-shell toughening agents, CTBNs (carboxyl and/or nitrile terminated butadiene/nitrile rubbers) and high molecular weight amine terminated polytetramethylene oxide, or dimer acid functionalised epoxy. The toughening agents are preferably selected from a group comprising core-shell toughening agents, like Paraloid™ 2650J from Dow, Paraloid™ 2690 supplier Dow, Kane Ace™ M521, Kane Ace™ M711, Kane Ace™ M721, Kane Ace™ MX 257 Kane Ace™ MX153 from Kaneka, or Clearstrength™ products from Arkema. The core shell is based on methacrylate-butadiene-styrene copolymers or methacrylate-butadiene copolymers (MBS). Alternative core shell material are acrylic impact modifiers from Arkema, with products from the trade name Durastrengths. CTBNs (carboxyl and/or nitrile terminated butadiene/nitrile rubbers) and high molecular weight amine terminated polytetramethylene oxide, or dimer acid functionalised epoxy. The toughening agent may also be carboxyl terminated butadiene acrylonitrile.

According to another aspect of the invention, the at least one adhesive layer may comprises an epoxy compound, a thermoplastic resin, an epoxy curing agent and in addition at least one component comprising at least one epoxy moiety and at least one linear or branched alkyl group and/or at least one mineral filler, wherein the at least one mineral filler is capable of absorbing water. The combination of these components provides an adhesive with excellent corrosion resistance.

The at least one mineral filler may be selected from the group consisting of metal oxides and metal hydroxides, preferably selected from the group of CaO, BaO, $K_2O$, $Li_2O$, $Na_2O$, $SiO_2$, SrO, MgO and mixtures thereof. The mineral filler may be CaO and/or $SiO_2$, and/or talc (hydrated magnesium silicate), and/or $CaCO_3$ preferably a blend comprising CaO and $SiO_2$.

The at least one adhesive layer may also comprise at least one further filler selected from the list of carbon black, graphite, a mineral carbon source, glass beads, glass chips, metal chips, metal flakes, preferably graphite glass beads, glass chips, more preferably graphite, even more preferably graphite flakes. The additional fillers may comprise thermally expandable graphite, and more preferably thermally expandable graphite flakes.

According to another aspect of the invention, the at least one adhesive layer comprises an epoxy compound, an epoxy curing agent and an acrylic polymer. As the acrylic polymers, acrylic copolymer which including nitrogen containing vinyl monomer and alkyl acrylic ester monomer may be used. The nitrogen containing vinyl monomer may be preferably selected from a group comprising dimethyl acryl amide, N-vinyl pyrrolidone, N-vinyl caprolactam and Acryloyl morpholine. The alkyl acrylic ester may be preferably selected from a group comprising butyl acrylate, 2-ethyl hexyl acrylate and iso-octyl acrylate.

According to yet another aspect of the invention, the at least one adhesive layer may further comprise a blowing agent.

The structural adhesive film according to the invention may further comprise a blowing agent. Any blowing agents, commonly known in the art, may be used in the composition of the structural adhesive film of the invention. By including a blowing agent in the composition of the structural adhesive film, the structural adhesive film becomes heat expandable and may be referred to as an expandable structural adhesive film. Accordingly, by heating, for example during the heating to cause thermosetting of the adhesive sheet, the structural adhesive film expands which helps sealing of any gap in the panel joint. The one or more blowing agents may be selected from the group of non-encapsulated and/or encapsulated blowing agents.

The thermosettable composition of the adhesive layer according to the invention may optionally comprise further components, additives or agents. Other optional ingredients that may advantageously be incorporated into the thermosettable composition include wetting agents such as those selected from the group consisting of titanates, silianes, zironates, zircoaluminates, phosphoric ester(s) and mixtures thereof. The wetting agent improves the mixability and processability of the composition and can also enhance the composition's handling characteristics.

Other optional ingredients which may be used include additives, agents or performance modifiers such as e.g. flame retardants, impact modifiers, heat stabilizers, colorants, processing aids, lubricants, and reinforcing agents.

The thermosettable composition of the adhesive layer may also comprise one or more fillers which may be used to regulate rheological properties of the precursor and adjust its viscosity to improve and adjust its processability for specific applications. Preferred fillers for use herein are selected from the group consisting of filler particles, microspheres, expendable microspheres, preferably pentane filled expendable microspheres or gaseous cavities, glass beads, glass microspheres, hydrophobic silica type fillers, hydrophilic silica type fillers, fumed silica, fibers, electrically and/or thermally conducting particles, nano-particles, and any combinations thereof.

It is also possible that the adhesive layer according to the invention comprises a melt-flowable and thermosettable composition that comprises an epoxy resin and a thermoplastic polymer having one or more functional groups capable of reacting with an epoxy material. The thermoplastic polymer may be a semi-crystalline polymer or an amorphous polymer having a glass transition temperature above −30° C. according to DSC measurement (DSC, dynamic scanning calorimetry, DIN EN ISO 11357-1). The thermoplastic polymer may comprise a polyvinylacetal or a polyester. It may also comprise a polyvinylbutyral. The melt-flowable and thermosettable composition may further comprise an acrylic polymer.

It is also possible that the adhesive layer according to the invention comprises a mixture of a first and second epoxy compound and an epoxy curing agent, wherein the first epoxy compound has a weight average molecular weight of at least 1000 g/mol and has an amount of epoxy groups of between 5 and 10 mole % and the second epoxy compound has a weight average molecular weight of not more than 400 g/mol and wherein the weight ratio of first to second epoxy compound is between 0.8 and 4.

The structural adhesive film according to the invention may be readily prepared by a number of techniques. For example, the various components may be added under ambient conditions to a suitable internal mixing vessel, such as a Mogul mixer. The mixing temperature is not critical and the mixing of the first and second epoxy components and the optimal toughening agent component is typically performed at a temperature of 80-85° C. When the epoxy curing agent component and the optional blowing agent component is added the temperature may preferably be decreased to not more than 70° C. Mixing is continued until the components form a homogenous mixture, after which time the thermosettable composition is removed from the mixer.

Due to their excellent processability the thermosettable composition can be processed as a film by conventional application equipment such as extruders or hot-melt coaters. The thermosettable composition may be processed as a self-supporting film or may alternatively be coated/laminate onto a suitable liner, such as e.g. a siliconized liner. The structural adhesive film of the invention may be applied to various substrates such as, for example metals (for example, Al, Al alloys, titanium or stainless steel) or other substrates comprising, for example, glass boron, carbon, Kevlar fibers, epoxy phenols, cyanate esters or polyester matrices.

The structural adhesive film according to the invention is typically a soft conformable film, and may or may not be tacky at room temperature. Prior to curing, the structural adhesive film is preferably deformable and drapable so that it can be applied to curved surfaces and assume any two-dimensional shape. The thickness of the structural adhesive film material may vary widely. Useful thicknesses have been found to be in the range of about 0.05 mm to 25 mm. For typical joining of metal panels, thickness may range from 0.1 to 5 mm, for example from 0.1 to 3 mmm, or from 0.3 to 1 mm.

The structural adhesive film may be packaged in the form of rolls of film material, rolls of tapes, i.e., length of material in narrow widths, or stacks of sheets cut to a desired dimension or shape for the end use. If the adhesive film is tacky, a release liner may be interleaved between adjacent sheets or wraps of a roll.

The structural adhesive film according to the invention may be packed in the form of rolls of film material, rolls of tapes, i.e. length of material in narrow widths, or stacks of sheets cut to a desired dimension or shape for the end use. If the adhesive film is tacky at room temperature, a release liner may be interleaved between adjacent sheets or wraps of a roll.

According to another aspect of the invention, the porous layer may be selected from a woven or knit or non-woven fabric. The porous layer may add new properties to the structural adhesive film. Depending on the nature of the woven, knit or non-woven fabric, the layer may help to increase the stability of the structural adhesive film, which leads to more robust covering of the outer edge of the outer panel in a hem flange connection. The porous layer may also be used to pre-form the structural adhesive film, before it is applied to any one of the panels and thereby is much more suitable for automated handling and application, in particular by fast robotic equipment. Finally the porosity of the layer may help the above mentioned gas that may be generated during curing, to escape out of the space between two panels next to the tape. This may lead to an improved appearance of the film after curing and to a complete covering of the outer edge of the outer panel.

According to another embodiment of the invention the porous layer may be a spunlaced or hydroentangled fabric. Spunlacing is also called hydroentanglement. It is a bonding process for wet or dry fibrous webs made by either carding, air-laying or wet-laying, the resulting bonded fabric being a non-woven. It uses fine, high pressure jets of water which penetrate the web, if transported by a belt or wire, hit the conveyor belt or conveyor wire and bounce back causing the fibers to entangle with each other. This process can also be considered as a two-dimensional equivalent of spinning fibers into yarns prior to weaving. In other words the hydroentangled bonding technology is a system in which water is emitted under high pressure and velocity from closely positioned nozzles onto a web of loose fibers. The intensity of the water stream and the pattern of the supporting drum or belt entangle, spin and curl the web's fibers about one another. The entangling of the fibers and the friction between the web's fibers yields a cohesive web. The water pressure has a direct bearing on the strength of the web, and very high pressures not only entangle but can also split fibers into micro- and nano-fibers which may give the resulting hydroentangled non-woven a leather like or even silky texture. This type of non-woven can be as strong and tough as woven fabrics made out of the same fibers.

According to another embodiment of the invention, the porous layer may be selected derived from cotton, glass, polyester, polyamide, polypropylene, carbon or aramid fibers or metal or a combination thereof. Any other suitable materials may of course also be used, like for example polyethylene, polyurethane, ethyl vinyl acetate (EVA), polyviscose, rubber or metal fabric like copper.

According to another embodiment of the invention, the porous layer may comprise a thickness in the range of 0.05 to 0.6 mm. The thickness of the porous layer may depend on the application of the structural adhesive film as well as on the material used for the porous layer.

According to another embodiment of the invention, the porous layer may comprise an area weight in the range of 5 to 200 g/m$^2$ preferably 30 to 100 g/m$^2$.

According to another embodiment of the invention, the porous layer may comprise a porosity in the range of 1000 to 7000 L/m$^2$/s measured according to ISO 139, $2^{nd}$ edition, 2005 Jan. 15. If the porosity of the porous layer is to low, the effect of providing ways for the gas to emerge and for providing space for the adhesive to flow is not seen. If the porosity of the porous layer is too high, the porous layer does not provide the needed "absorbing capacity" or "adhesive retentiveness" for the structural adhesive film.

According to another embodiment of the invention, the porous layer may be made of stretchable textile such as knitted polyester or cotton fabric or glass fibre woven. If the textile has unfixed intersections of the strands, the textile may have a high stretch-ability to provide a good conformability to the structural adhesive films. Further, if the stretchable textile has a strand density of 5 or more strands per 1.5 cm, the textile may make effective channels of the structural adhesive films to vent gaseous generated during the curing process.

According to another embodiment of the invention, the adhesive layer may be positioned on one side of the porous layer. It may also be positioned on both sides of the porous layer. All other constructions of the structural adhesive film are possible as well. The layer may be positioned on both sides of the adhesive layer. The number of porous layers and adhesive layers is not limited to one or two, there can be more than one or two of both of them. The two layers may appear in an alternating way or there may be two or more layers of an adhesive and/or layer positioned next to each other. Any other arrangement of the layers is possible as well.

The porous layer may extend along the entire width of the adhesive layer. It is also possible, that the width of the adhesive layer is larger than the width of the porous layer.

According to another embodiment, the adhesive layer may be divided in two parts that are arranged on one side of the porous layer.

The invention also relates to a method for bonding and sealing panels, wherein the method comprises the following steps:
  a. providing a first metal panel and a second metal panel;
  b. providing a structural adhesive film comprising:
    at least one adhesive layer and
    at least one layer with a porous structure the adhesive layer comprising an epoxy compound as well as an epoxy curing agent;
  c. applying the structural adhesive film to a flange portion of either the first panel or the second panel;
  d. bending either the first panel or the second panel over the flange portion of the according other metal panel thereby positioning the structural adhesive film between the two panels covering the flange portion of the inner panel;
  e. heating the panel assembly above an activation temperature of the structural adhesive film.

BRIEF DESCRIPTION OF THE DRAWINGS

The invention will now be described in more detail with reference to the following Figures exemplifying particular embodiments of the invention.

DETAILED DESCRIPTION OF EMBODIMENTS

Figure 1:
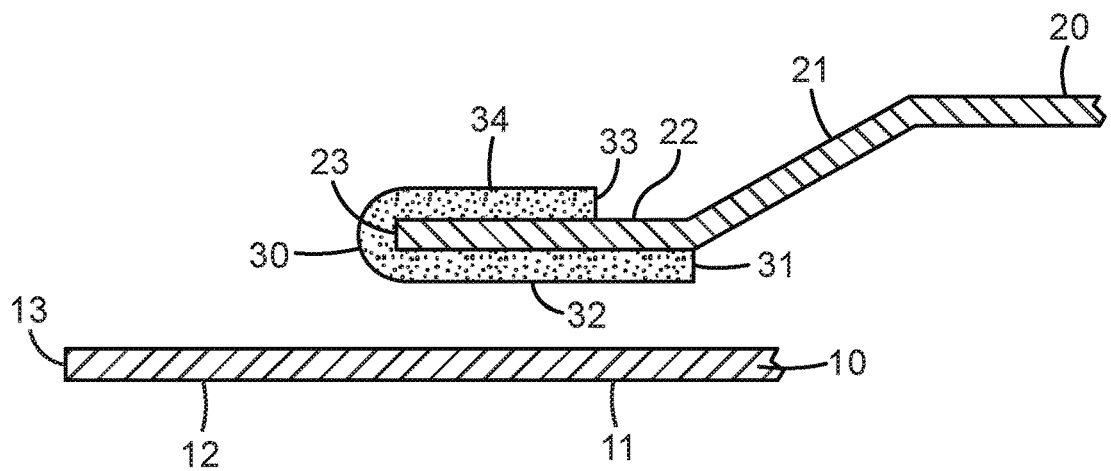
FIG. 1 is an embodiment showing a cross-sectional view of an inner panel with a structural adhesive film applied thereto and an outer panel before joining it with the inner panel.

Herein below various embodiments of the present invention are described and shown in the drawings wherein like elements are provided with the same reference numbers.

Figure 2:
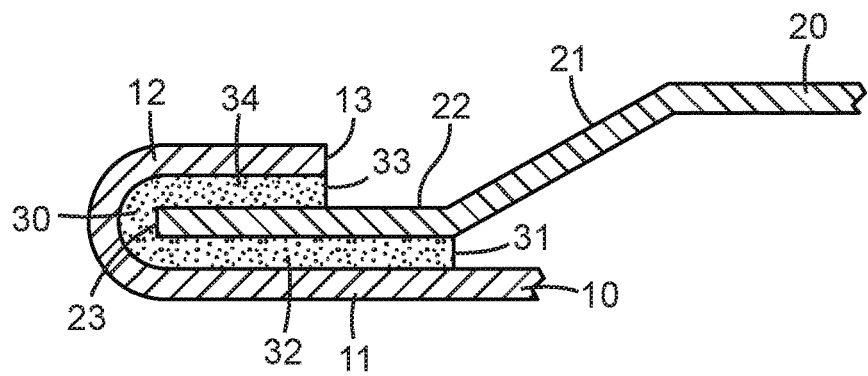
FIG. 2 is a cross-sectional view of a metal penal assembly in accordance with one aspect of the invention.

FIG. 1 and FIG. 2 show the use according to the invention of a structural adhesive film for bonding and sealing a hem flange connection between metal panels.

As shown in FIG. 1, an outer metal panel 10 comprises a body portion 11 with a flange 12 along a margin of the body portion near end 13 of the outer panel 10. As can be seen in FIG. 2 in the hem flange bonding process the flange 12 is folded over flange 22 of the inner panel 20. Flange 22 of the inner panel 20 is along a margin of body portion 21 of the inner panel near end 23. End 23 is adjacent flange 12 of the outer panel 10. A structural adhesive film 30 is located between the inner 20 and outer panel 10. A portion 32 near end 31 of the structural adhesive film 30 is located between body portion 11 of outer panel 10 and the flange 22 of inner panel 20. The structural adhesive film 30 is folded (hemming process) over inner panel 20 and hence portion 34 near end 33 of the structural adhesive film 30 is between flange 12 of the outer panel 10 and flange 22 of the inner panel 20. The structural adhesive film 30 bonds the two metal panels together at the joint or hem.

In accordance with one aspect illustrated in FIG. 2, a metal part assembly in accordance with the present invention, for example as illustrated in FIG. 1, may be obtained by adhering the structural adhesive film 30 to the inner metal panel 20. However, it is also possible to instead adhere the structural adhesive film 30 to the outer panel prior to joining the metal panels (not illustrated). As shown in FIG. 2, the structural adhesive film 30 is adhered to the inner panel. In one particular aspect, the structural adhesive film 30 has a surface that is tacky at ambient temperature, typically about 20° C., and can be adhered to the inner panel via this tacky surface. The structural adhesive film may allow forming an adhesive bond sufficient to hold the metal parts together in the metal joint without requiring curing of the composition of the structural adhesive film. It is also possible that the structural adhesive film is heated before curing below the curing temperature to initiate the above mentioned tack.

The outer panel may then be folded such that the flange 12 of the outer panel is folded over the flange 22 of the inner panel 20 and over portion 34 of the structural adhesive film 30. Accordingly, outer panel 10 will be folded over inner panel 20 with the structural adhesive film located between the two panels and thus a metal joint is obtained. In case the structural adhesive film 30 was adhered to the outer panel 10 instead of the inner panel 20, the structural adhesive film 30 will be folded in-between the panels during folding of the outer panel 10 over flange 22 of the inner panel 20.

It is also possible, in case the structural adhesive film 30 is pre-formable, that the structural adhesive film 30 is pre-formed in for example a u-shaped form and afterwards applied to the first panel 20, thereby covering its outer edge 23, before the second panel 30 is folded around the outer edge 23 of the first panel.

Figure 3:
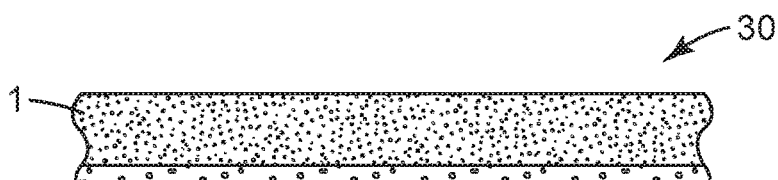
FIG. 3 is a cross-sectional view of one embodiment of a structural adhesive film used in the invention.
Figure 4:
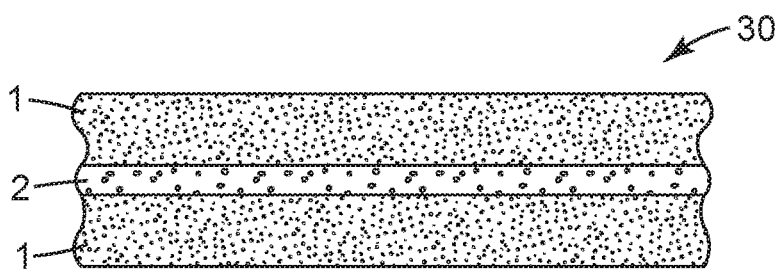
FIG. 4 is a cross-sectional view of another embodiment of a structural adhesive film used in the invention.

FIG. 3 is a cross-sectional view of a structural adhesive film 30 according to the invention with a first adhesive layer 1 and a second porous layer 2. First adhesive layer 1 and second porous layer 2 are positioned adjacent to each other, in the drawing the first adhesive layer is positioned on top of the second layer 2. FIG. 4 is a cross-sectional view of a structural adhesive film 30 with a first adhesive 1, a second porous layer 2 and a third adhesive layer 1, the two adhesive layers are positioned on both sides of the second porous layer 2. Adhesive layer 1 or adhesive layers 1 may extend over the same widths as the layer 2. It is also possible—as indicated in FIG. 5 that adhesive layer 1 has a larger width as the porous layer 2.

Figure 6:
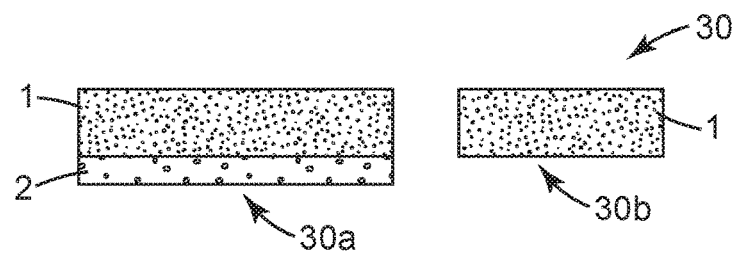
FIG. 6 is a cross-sectional view of another embodiment of a structural adhesive film used in the invention.
Figure 7:
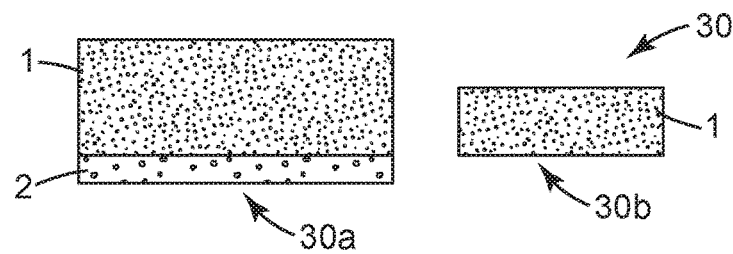
FIG. 7 is a cross-sectional view of another embodiment of a structural adhesive film according to the invention.

It is also possible to provide the structural adhesive film 30 in several parts as indicated in FIGS. 6 and 7. FIG. 6 shows a cross-sectional view of another structural adhesive film 30 according to the invention with a first part 30a and a second part 30b. The first part 30a comprises a first adhesive layer 1 and a second porous layer 2. The second part 30b comprises only one adhesive layer 1. The embodiment shown in FIG. 7 differs from the embodiment shown in FIG. 6 in that the adhesive layer 1 in the part 30a is thicker as the adhesive layer in part 30b.

Figure 5:
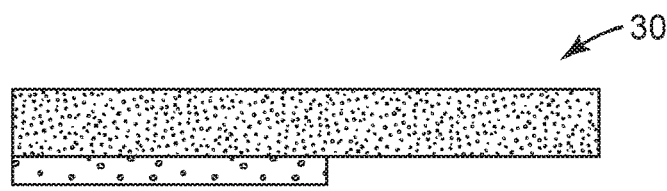
FIG. 5 is a cross-sectional view of another embodiment of a structural adhesive film used in the invention.
Figure 8:
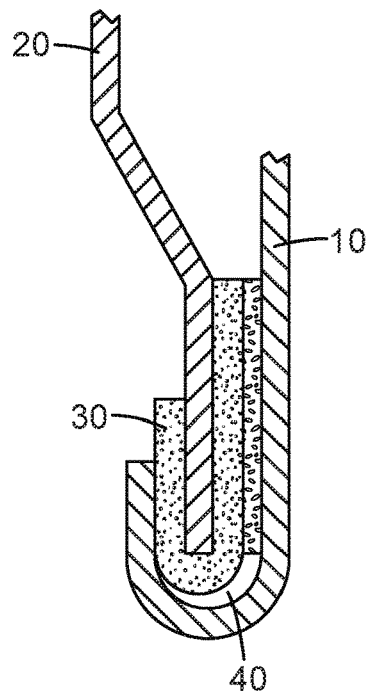
FIG. 8 is a cross-sectional view of a metal panel assembly according to another aspect of the invention with a structural adhesive film shown in FIG. 5.

The cross-sectional view of a metal panel assembly of FIG. 8 shows a hem flange connection with an outer 10 and an inner metal panel 20 and a structural adhesive film 30 as shown in FIG. 5 in between the two metal panels 10 and 20. The porous layer 2 of the structural adhesive tape 30 faces the body portion 11 of the outer panel 10. The adhesive layer 1 of the structural adhesive film 30 faces the flange portion 22 of the inner panel 20.

Figure 9:
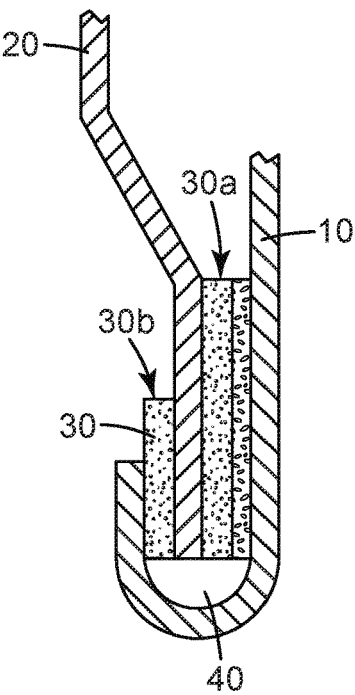
FIG. 9 is a cross-sectional view of a metal panel assembly according to another aspect of the invention with a structural adhesive film shown in FIG. 6.

The cross-sectional view of a metal panel assembly of FIG. 9 shows a hem flange connection with an outer 10 and an inner metal panel 20 and a structural adhesive film 30 as shown in FIG. 6 in between the two metal panels 10 and 20. The porous layer 2 of part 30b of the structural adhesive tape 30 faces the body portion 11 of the outer panel 10. The adhesive layer 1 of part 30b faces the flange portion 22 of the inner panel. The adhesive layer 1 of part 30a of the structural adhesive film 30 faces the other side of the flange portion 22 of the inner panel 20.

As indicated in FIGS. 8 and 9, there may be some space 40 between the metal panels and the structural adhesive film 30 after the film has been applied and after the outer metal panel 10 has been folded over the inner metal panel. In some instances it is possible that the hemmed metal panel assembly, with an uncured and unexpanded structural adhesive film 30 according to the invention in between the two panels 10 and 20 passes a bath before being put into a curing oven. During this process step, liquid may enter the space 40 between the two panels next to the film 30. During curing, when heat gets applied, the liquid may get gaseous and try to escape along either path A or path B. In order to avoid that this process impacts the appearance of the cured structural adhesive film 30 the layer 2 is porous, therewith providing areas through which the gas may escape, without impacting the adhesive layer.

Examples

Test Methods:

The invention relates to the use of a structural adhesive film for bonding and sealing a hem flange connection between panels, e.g. metal panels. One important criteria for a car manufacture is the visual appearance of the film after the two panels are brought together and after the structural adhesive film was cured.

The visual appearances is tested by looking at the cured film in the hem flange connection. An experienced person can decide if the visual appearance is good or not good. A good visual appearance can be defined as a film surface that has a surface that extends essentially linear and essentially parallel to the edges of the panels it is bonding together, thereby covering the outer edge of the outer panel of the hem flange connection. In addition, to the linear and parallel extension of the film a film with a good appearance has a smooth surface that is essentially free from irregularities like bubbles or entrapped gas.

List of Materials for the Adhesive Layer:

TABLE 1

| Material | Function | Description | Wt. % |
| --- | --- | --- | --- |
| Epikote 828 or Epon 828 | Epoxy resin | Trade designation of a liquid reaction product of epichlorohydrin and bisphenol A having an approximate epoxy equivalent weight of 184-192 grams/equivalent, according to ASTM D 1652. Commercially available by Momentive Or Resolution Performance Products | 54.5 |
| PK-HH Or PK-HP 200 | Thermoplastic resin | Trade designation of a phenoxy resin. Commercially available by InChem Corporation. | 26.0 |
| Paraloid 2650J | Toughening agent | Trade designation of a core-shell toughening agent based on butadiene rubber. Commercially available by DOW | 13.5 |
| Amicure CG1200 | Primary Curative | Trade designation of 2-cyanoguanidine (dicyandiamide), available from Air Products. | 3.3 |
| Omicure U52M | Curative accelerator | Trade designation of 4,4 methylene bisphenyl dimethyl urea, available from CVC Speciality Chemicals, USA. | 1.5 |
| Eurocell 140 | Particulate filler | Trade designation of expanded perlite, commercially available by Europerl, Germany. | 1.2 |

The epoxy-based compositions of the present invention are prepared by combining the ingredients from the list of materials of table 1 in a high speed mixer (DAC 150 FVZ Speed mixer, from Hauschild Engineering) Stirring at 3000 rpm. In Table 2, the concentrations are given as wt. %. In a first step the epoxy resin, the thermoplastic phenoxy resin and the core shell toughening agent are mixed together for 2 min. The mixture is then placed into an air-driven oven at temperature of 95° C. for about 1 h. The hot mixture is again stirred for 2 min at 3000 rpm in the speed mixer to ensure complete dispersion of the three ingredients. Then the mixer temperature is reduced to 60° C. and the two curatives (Amnicure CG1200 and Omnicure U52M) together with the physical blowing agent, and optionally the filler material and/or the glass beads, are added to the mixture, followed by mixing for an additional 2 minutes under vacuum. The resulted mixture is a paste having a uniform consistency. By using a knife coater the mixer can be hot coated to a film.

List of Materials for the Porous Layer/List of Examples:

TABLE 2

| | Product Name | Material | Additional Information | Porosity $L/m^2/s$ |
| --- | --- | --- | --- | --- |
| Comp. Example | adhesive film without porous layer | | | |
| Example 1 | polyester woven | 3M RM1173100 | Polyester | 90 $g/m^2$ 0.2 mm | 78 |
| Example 2 | polyester non woven | Reemay 2016 | Polyester | 46 $g/m^2$ 0.25 mm | 3443 |
| Example 3 | spunlaced wipe-non woven | Spunlaced Sandler-Sawatex ® 2058 | Polyester | 42 $g/m^2$ 0.25 mm | 3763 |
| Example 4 | spunlaced wipe-non woven | Spunlaced Sandler-Sawatex ® 2621 | Polyester | 30 $g/m^2$ 0.25 mm | 6263 |
| Example 5 | spunlaced wipe-non woven | Spunlaced Sandler-Sawatex ® 2621 | Polyester | 60 $g/m^2$ 0.45 mm | 2670 |

The above mentioned different porous layers were coated between 2 adhesive layers of 0.1 to 0.15 mm thickness so that the final sandwich is 0.5 mm thick. As a comparative example a 0.4 mm adhesive film without a porous layer is provided.

The structural adhesive film according to the above described examples examples were applied on an edge of a metal panel so that the adhesive film was covering the edge and the adhesive surfaces stick on both sides of the panel. The metal panel was a 40 by 200 mm (metal galvanized steel DX 54 D+Z from supplier Thyssen Krupp) panel. Table 3 shows how the different examples behave during the application of the film. While the film without a mesh could easily be applied to the metal panels, examples 1 and 2 tended to pop of the both sides of the metal panel due to the stiffness of the used porous layer. Example 1 is so stiff that the bending on the metal edge is difficult to do, the adhesive film springs back to the original flat shape because of the stiffness of the woven fabric. Example 3, 4 and 5 with a spunlaced wipe were easy to apply and stayed on the metal panel after application, thanks to the softness of the wipe fabric.

Afterwards a second metal panel—same geometry as the first panel—was brought together with the first metal panel a hemming process was conducted by manually hemming the two metal panels together with a press. The adhesive film was applied to the inner panel and a second outer panel was hemmed around the inner panel as described above.

The hemmed metal construction with the tape was then treated in a water bath of 65° C. The construction was then cured in the oven, at 180° C. for 30 minutes.

After curing the examples were visually inspected by an experienced person in the area of structural adhesive films and the visual appearance of the structural adhesive film after cure was evaluated. The comparative example (adhesive without porous layer) provided a film after cure with a surface with bubbles. Example 1 shows a mesh after cure that was not formable in the oven. Therefore the cured adhesive shows a gap between the film and the panel. The structural adhesive film according to example 2 shows the same behaviour as from example 1. The structural adhesive film according to example 3 had a good visual appearance after cure. The porous layer absorbed the adhesive. There was enough free adhesive not retained on the wipe, able to flow and covers the edge of the panel (per gravity and capillarity). Examples 4 and 5 showed the same good results regarding the visual appearance as example 3.

TABLE 3

| | | Handling | Visual Appearance |
|---|---|---|---|
| Comp. Example | adhesive film without porous layer | good | Bubbling |
| Example 1 | polyester woven | Difficult to handle, to stiff, pop up | Mesh is too stiff, creates gap between adhesive tape and panel |
| Example 2 | polyester non woven | Difficult to handle, to stiff, pop up | Mesh is too stiff, creates gap between adhesive tape and panel |
| Example 3 | Spunlaced wipe-non woven | good | good |
| Example 4 | Spunlaced wipe-non woven | good | good |
| Example 5 | Spun laced wipe-non woven | good | good |

The invention claimed is:

1. A hem flange connection between panels to be bonded and sealed with a structural adhesive film, the structural adhesive film in its uncured state is an uncured film comprising:
   at least one adhesive layer having an adhesive major surface; and
   at least one porous layer with a porous structure and having a porous major surface,
   wherein the adhesive layer comprises an epoxy compound as well as an unreacted epoxy curing agent, and the adhesive major surface faces and contacts the porous major surface.

2. The hem flange connection between panels according to claim 1, wherein the at least one adhesive layer comprises an epoxy compound, an epoxy curing agent, a thermoplastic resin and optionally a toughening agent.

3. The hem flange connection between panels according to claim 1, wherein the at least one adhesive layer comprises an epoxy compound, a thermoplastic resin, an epoxy curing agent and in addition at least one component comprising at least one epoxy moiety and at least one linear or branched alkyl group and/or at least one mineral filler, wherein the at least one mineral filler is capable of absorbing water.

4. The hem flange connection between panels according to claim 1, wherein the at least one adhesive layer comprises an epoxy compound, an epoxy curing agent, and an acrylic polymer.

5. The hem flange connection between panels according to claim 1, wherein the at least one adhesive layer further comprises a toughening agent and/or a blowing agent.

6. The hem flange connection between panels according to claim 1, wherein the porous structure is selected from a woven or knit or non-woven fabric.

7. The hem flange connection between panels according to claim 1, wherein the porous structure is a spunlaced or hydroentangled fabric.

8. The hem flange connection between panels according to claim 1, wherein the porous structure is derived from cotton, glass, polyester, polyamide, polypropylene, carbide or aramid fibers or metal or a combination thereof.

9. The hem flange connection between panels according to claim 1, wherein the porous layer comprises a thickness in the range of 0.05 to 0.6 mm.

10. The hem flange connection between panels according to claim 1, wherein the porous layer comprises an area weight in the range of 5 to 200 g/m$^2$.

11. The hem flange connection between panels according to claim 1, wherein the porous structure comprises a porosity in the range of 1000 to 7000 L/m$^2$/s measured according to ISO 139, $2^{nd}$ edition, 2005-01-15.

12. The hem flange connection between panels according to claim 1, wherein in the uncured film, the adhesive layer is positioned on one or on both sides of the porous layer.

13. The hem flange connection between panels according to claim 1, wherein the adhesive layer has a width and the porous layer has a width, and in the uncured film, either the porous layer extends along the entire width of the adhesive layer or the width of the adhesive layer is larger than the width of the porous layer.

14. The hem flange connection between panels according to claim 1, wherein in the uncured film, the adhesive layer is divided in two parts that are arranged on one side of the porous layer.

15. The hem flange connection between panels according to claim 3, wherein the at least one mineral filler is selected from the group consisting of metal oxides and metal hydroxides.

16. The hem flange connection between panels according to claim 1, wherein the at least one layer with a porous structure is a porous carrier layer.

17. The hem flange connection between panels according to claim 1, wherein the at least one layer with a porous structure is a malleable scrim or mesh.

18. The hem flange connection between panels according to claim 1, wherein the at least one layer with a porous structure is a wipe.

19. The hem flange connection between panels according to claim 18, wherein the at least one layer with a porous structure is a spunlaced wipe.

* * * * *